Dec. 19, 1944.　　　　S. W. LYON ET AL　　　　2,365,348
HARDNESS TESTER
Filed March 25, 1942　　　2 Sheets-Sheet 1

INVENTORS
Stuart W. Lyon
Francis C. Huyser
BY
Bruno C. Lechler
ATTORNEY

Dec. 19, 1944.  S. W. LYON ET AL  2,365,348
HARDNESS TESTER
Filed March 25, 1942  2 Sheets-Sheet 2

INVENTORS
Stuart W. Lyon
Francis C. Huyser
BY
Bruno C. Lechler
ATTORNEY

Patented Dec. 19, 1944

2,365,348

UNITED STATES PATENT OFFICE 2,365,348

HARDNESS TESTER

Stuart W. Lyon, Moline, and Francis C. Huyser, East Moline, Ill., assignors to American Machine and Metals, Inc., New York, N. Y., a corporation of Delaware Application March 25, 1942, Serial No. 436,072

12 Claims. (Cl. 73—81)

This invention relates to improvements in that type of testing machine for determining the hardness of metals wherein an indentor is forced into the metal under a known load by a hydraulic plunger and the depth or the width of the indentation produced is measured to secure an index of the hardness of the specimen. In such machines the pressure on the hydraulic plunger is brought up to a desired predetermined value and the accuracy of the reading of the machine depends on the maximum pressure attained just equalling the specified indentation pressure.

This maximum pressure may be determined by providing a vertical cylinder containing a plunger loaded with a weight and giving this plunger enough vertical travel to act as an accumulator for surplus liquid. As the indentor stroke is short, liquid may be supplied by a single-stroke pump, and therefore the volume of surplus liquid to be absorbed by the accumulation is not great.

As the indentor pressure on the specimen is in the order of 3000 kg. we make the plunger carrying the weight as small as possible while the indentor plunger diameter is made much larger. In this way a weight of only 72 pounds can create the hydraulic pressure to give 3000 kg. on the specimen. When the single-stroke-pump stroke is rapid, the indentation pressure is not that corresponding to the weight but rather that required to accelerate the weight, so that instead of 3000 kg. we get a larger indentation pressure and too large an indentation.

Further, though the single-stroke pump, often hand operated, can be stopped as soon as the weight floats on the accumulator plunger, this may not be done and the weight may hit the top stop which also creates an excessive indentation pressure.

One object of the invention is to provide a relief valve that is opened when the accumulator has reached a given level.

Another object is to transfer the pressure of the weight gradually to the accumulator plunger and to gradually open the relief valve to avoid the effect of acceleration of the weight on the pressure exerted on the specimen.

Another object of the invention is to avoid injury or binding of the small accumulator plunger by suspending the weight pivotally.

Another object of the invention is to support the weight in a horizontal plane so that it may be rotated in that plane before the accumulator plunger supports the weight pivotally, taking it off its original support. Thereby we are able to transfer to the small accumulator plunger rotation without oscillation that might cause binding. Thereby we secure a lower friction coefficient on the plunger at the time when it is determining the pressure on the specimen.

A further object of the invention is to provide separate means for unloading the accumulator plunger after the test and for absorbing the inertia impact of the falling weight.

Since at each test some of the liquid is lost by leakage, means must be provided to replenish this in a manner that prevents the drawing in of air. Means must also be found to get rid of any air trapped, otherwise the compression of the entrapped air absorbs too much of the useful stroke of the pump.

Therefore a further object is to produce a combined cylinder and sump arranged so that any oil lost may, without check valves, be added to the system at each test.

A further object is to provide a liquid pressure system in which the surplus liquid with any air entrapped is ejected at the top of the system and returned to a sump from the surface of which the air may escape before the liquid is drawn back into the system.

A further object of the invention is to provide a single-stroke pump driven by a hand wheel in a manner that will create a higher pressure as the conclusion of the test approaches.

Various other advantages will be obvious from the description.

Figure 1:
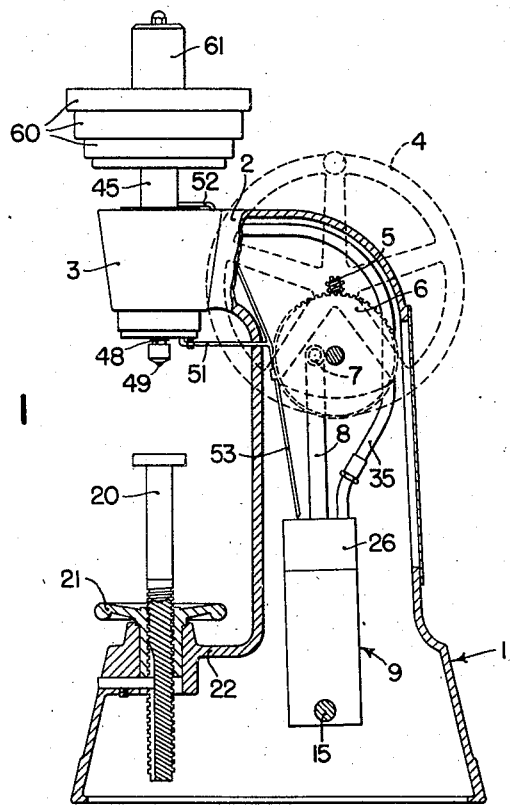
Figure 1 is an elevation partly in section showing the improved hardness testing machine.
Figure 2:
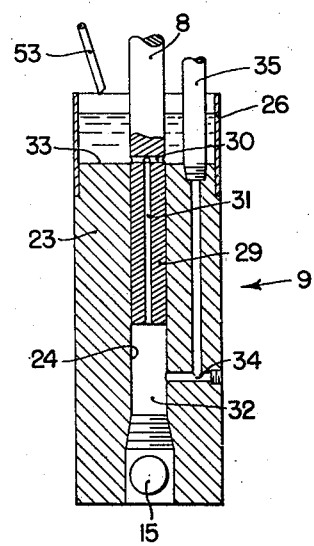
Figure 2 is an enlarged section of the pump shown in Figure 1.
Figure 3:
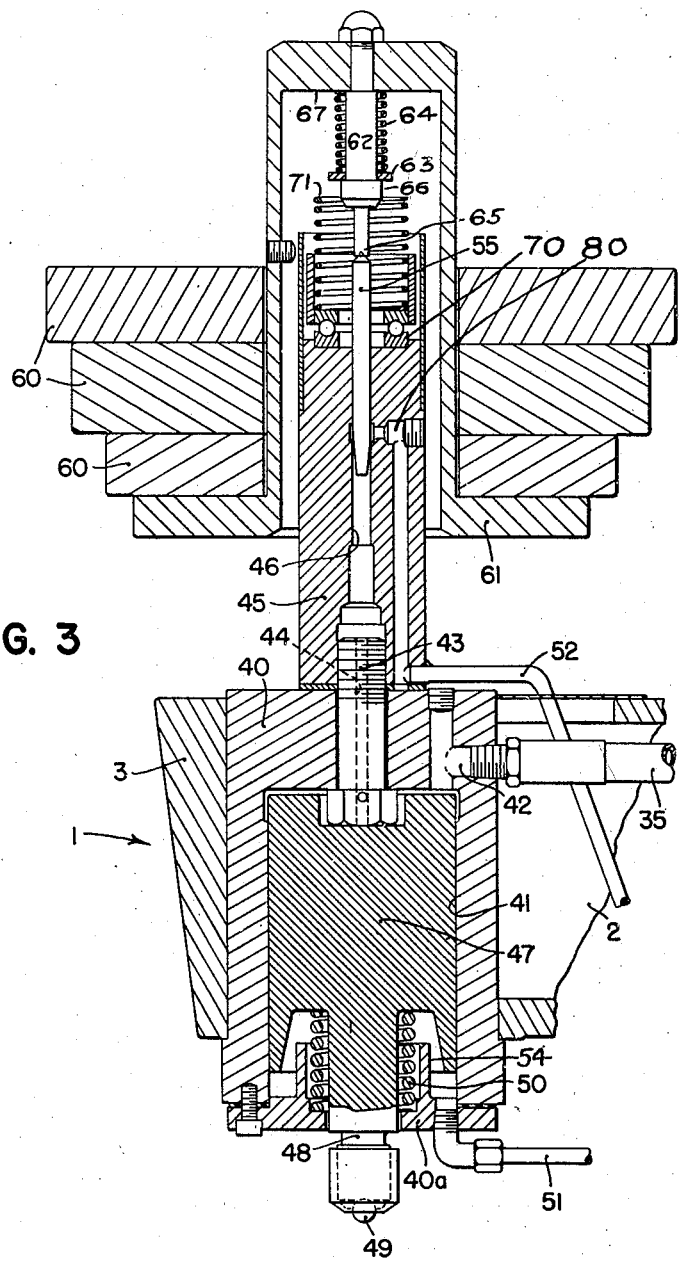
Figure 3 is an enlarged section of a portion of Figure 1.

The testing machine comprises a base 1, which has an overhanging arm 2, which carries the support 3, for the pressure-applying mechanism.

Specimens to be tested are supported on a vertically adjustable table post 20 which can be moved vertically by turning a hand wheel 21. The hub of the hand wheel 21 turns free in the socket 22 and the threaded bore of the hand wheel moves the splined table post 20 vertically. The specimen is moved vertically until it is approximately in contact with the indentor, shown as ball 49. Supported in the housing is a shaft which carries a pinion 5 and a hand wheel 4. This pinion meshes with a gear 6 also supported in the housing, which carries a stud 7. To this stud is connected the plunger 8 which moves in the cylinder 9. The cylinder is pivoted in the housing at 15.

The length of the plunger 8 is such that when the plunger approaches the lower end of its travel the stud 7 is near the dead center. The plunger 8 and the radius of gear 6 on which stud 7 is located form a toggle when the plunger is near its lowest position. A very heavy pressure may be exerted upon the liquid in the pump as the dead center is approached without undue exertion of the operator.

The pump comprises the body 23 which is pivoted at 15, and which has a bore 24. At its upper end a reservoir is formed by a rim 26 which extends above the top surface 33 of the body 23. The plunger 8 which slides in bore 24 has an axial hole 31 which extends back through the forward part 29 of the plunger and connects with the small passages 30 which lead to the reservoir when the plunger is in its upper position. The passage 34 extends from the lower side of the bore and connects to the delivery pipe 35 which transmits the liquid under pressure to the indentor cylinder 40 in the support 3.

The indentor cylinder 40 has an axial bore 41 in which slides the indentor piston 47. This piston is normally held in its upper position by a spring 50, which reacts against the end head 40A, of the cylinder. The liquid under pressure is supplied to the bore 41 through inlet 42. An extension 48 of the piston 47 carries the indentor ball 49. To avoid friction of the extension 48 as it passes through the end head of the cylinder and still prevent leakage of liquid, the extension has considerable clearance in the end head and a circular, vertical flange 54 is provided, which forms a gutter for any liquid that leaks down between the piston 47 and the cylinder walls of the bore. This liquid is carried back to the reservoir in the pump by an overflow drain 51 leading to conduit 53.

A pillar 45 is fastened to the top of the indentor cylinder 40 by a stud 43 which has an axial passage 44 that permits the liquid to pass from the indentor cylinder up into the accumulator cylinder 46 of the pillar. The escape of liquid from the bore 46 is normally prevented by a small, well-fitting accumulator plunger 55 that extends well down into the accumulator cylinder. When the accumulator plunger 55 is near the upper end of its travel its lower tapered end will gradually open a passage into a space 80, thus permitting the escape of liquid through the relief valve conduit 52 that returns the escaping liquid to the pump reservoir. The pressure upon the liquid is secured by weights 60 which are supported in a hanger 61 which is pivotally supported upon the plunger 55. Thus a high unit pressure on the liquid is secured.

Hanger 61 is provided with a sliding stud 62 the end 65 of which is adapted to bear upon the upper end of the plunger 55. The bearing surface 65 is conical or cup-shaped so as to provide a friction drive when the weight is turned and still allow the weight to swing about the upper end of the plunger 55. The stud 62 has a head 66 and back of that head lies a washer 63 against which a preloaded spring 64 bears. The purpose of this washer and spring which is preloaded sufficiently to support hanger 61 and weight 60 is to allow the stud 62 to recede into the hanger 61 under impact when the plunger moves downward after a test. In this manner, the possibility of injuring the plunger 55 by having it strike the stud 43 is prevented. On top of the pillar 45 is a thrust ball bearing 70. The internal bore of the bearing is such that a head 66 can pass through, but the washer 63 will bear upon the ball bearing and thus the load of the weight 60 is carried on the ball bearing. This permits spinning the weight supported near its own center of gravity on a fairly broad base and prevents it from getting into an oscillation. The ball bearing supports a spring 71 of a diameter that allows it to pass outside of the washer 63 and bear on surface 67 of the hanger 61 before the washer 63 bears on ball bearing 70. Spring 71 takes part of the weight of hanger 61 when the machine is not loaded; the balance of the weight of the hanger 61 and weights 60 being carried by spring 64. At the conclusion of the test, when the weight falls down, the preloaded spring 64 comes into play and takes the impact load and prevents injury to the ball thrust bearing 70.

As the volume of liquid transmitted by the pump is small, after the indentor has been seated on the specimen, most of it passes into bore 46 to lift the weights and, after the desired pressure has been reached, passes out through the relief valve.

We have found that in connection with a hand-operated pump irregularities enter, possibly due to the operation of the hand wheel by different operators at different speeds. We have found that at the moment that the pressure in the liquid is sufficient to lift the weights, which are then stationary, there is an instantaneous rise of pressure above that which would correspond to the load on the plunger. This may be related to the force required to accelerate these weights. We have found that by supporting a part of the weight on a spring 71 and the rest on the precompressed spring 64 this difficulty is obviated. The plunger starts moving with only a part of the weight supported on the liquid, but, before the plunger has moved far enough to allow the escape of fluid through the relief valve, all of the weight is carried on the liquid.

The operation of this machine will be understood from the description that has preceded. The specimen is placed on the table post which is raised until the specimen is close to the indentor. The weight 60 supported on springs 71 and 64 and the ball bearing 70 is spun gently. The operator grasps the hand wheel and the pinion turns the gear and the plunger moves down into the cylinder. At the beginning of its stroke, the reservoir is in touch through passages 30 and 31, with the liquid line 35. If at the end of the last test there was any shortage of liquid in the system, the liquid has run from the sump into the cylinder without the possibility of drawing in air. The plunger does not come entirely out of the sump. As the plunger moves down further the outlet 30 is closed and thereafter the liquid, which is contained in the system below the plunger, is trapped. As this liquid is moved through the discharge line it forces the indentor piston downward and the ball indentor against the specimen. As the hand wheel continues its movement the toggle, which is formed by the plunger and the radius of the gear that contains the stud 7, approaches a straight line or dead center and in so doing the pressure in the liquid builds up. As the indentor is now bearing upon the specimen to be tested, the surplus fluid will pass up through the passage in the stud into the bore 46 and proceed to lift the plunger 55. As this plunger contacts the lower end of stud 66 it will take some of the load and begin lifting the weight 60. As this operation proceeds the spring 71 will bear less and less of the load and the plunger 55 will take more of the load, thus creating a gradual building up of the pressure in the system until the weight is floating on the plunger and the indentor pressure reaches the preset value. About the time that this has been accomplished the plunger has approached the side exhaust passage. There is a gradual discharge of surplus fluid and the pressure remains stationary at a value corresponding to the weight 60 and the cross section of the plunger 55. As the plunger 55 contacts the spinning stud 66 it too starts to rotate and thus the friction decreases so that when the point of opening the relief valve has been reached, the plunger is revolving, giving the lower friction of moving surfaces, making the relief valve more sensitive to pressure variation as the pressure reaches its maximum. The indentation is now complete and as the hand wheel is returned to its initial position the liquid is drawn back into the pump.

The indentor is lifted by spring 50. The falling weight 60 compresses spring 71 and the remaining inertia blow is absorbed by the compression of preloaded spring 64.

The invention is not limited to the precise construction shown and other methods of carrying out the invention will suggest themselves to one skilled in the art. It will be understood that the provisions here illustrated as means for overcoming the inertia effects of a plunger loaded by weights apply equally well to overcome the inertia effects of a plunger which is loaded, in part, by a spring.

What we claim is:

1. A hardness tester having, in combination, a frame carrying a support for a test piece, a vertical cylinder above the support carried by the frame, a vertical extension of the cylinder, a bore of smaller diameter than that of the cylinder extending vertically upward from the cylinder into the extension, a ram movable in the cylinder, an indentor carried by the ram, a plunger freely movable in the small bore, a weight whose center of gravity is below the top of the plunger, free to oscillate on and supported pivotally on the plunger, means to supply fluid under pressure to the top of the cylinder, the fluid forcing the indentor against a test piece and lifting the weight supported on the plunger.

2. A hardness tester having, in combination, a frame carrying a support for a test piece, a vertical cylinder above the support carried by the frame, a vertical extension of the cylinder, a bore of smaller diameter than that of the cylinder extending vertically upward from the cylinder into the extension, a ram movable in the cylinder, an indentor carried by the ram, a plunger freely movable in the small bore, a weight whose center of gravity is below the top of the plunger, free to oscillate on and supported pivotally on the plunger, a supplementary support for the weight, means to supply fluid under pressure to the top of the cylinder, the fluid forcing the indentor against a test piece and lifting the weight from the supplementary support permitting it to oscillate on the plunger.

3. A hardness tester having, in combination, a frame carrying a support for a test piece, a vertical cylinder above the support carried by the frame, a vertical extension of the cylinder, a bore of smaller diameter than that of the cylinder extending vertically upward from the cylinder into the extension, a ram movable in the cylinder, an indentor carried by the ram, a plunger freely movable in the small bore, a weight whose center of gravity is below the top of the plunger, free to oscillate on and supported pivotally on the plunger, a supplementary support for the weight whereon the weight can be rotated about the plunger axis, means to supply fluid under pressure to the top of the cylinder, the fluid forcing the indentor against a test piece and lifting the weight from the indentor against a test piece and lifting the weight from the supplementary support permitting the weight to oscillate while rotating.

4. A hardness tester having, in combination, a frame carrying a support for a test piece, a vertical cylinder above the support carried by the frame, a vertical extension of the cylinder, a bore of smaller diameter than that of the cylinder extending vertically upward from the cylinder into the extension, a ram movable in the cylinder, an indentor carried by the ram, a plunger freely movable in the small bore, a weight whose center of gravity is below the top of the plunger free to oscillate on and supported pivotally on the plunger, a supplementary support for the weight including a ball thrust bearing whereon the weight can be rotated about the plunger axis, means to supply fluid under pressure to the top of the cylinder, the fluid forcing the indentor against a test piece and lifting the weight from the supplementary support, permitting it to oscillate while rotating, the rotating weight turning the plunger on its axis.

5. In a hydraulically operated hardness tester, in combination, a cylinder, a ram movable in the cylinder carrying an indentor, a supply line of liquid to the cylinder, means for controlling the increase of pressure on the liquid and its maximum pressure, these means including an expansible chamber connected with the liquid supply line, a load adapted to be supported on the expansible chamber, a secondary support for the load, means permitting the gradual transfer of the load from the secondary support to the expansible chamber as the chamber expands, means interposed between the load and the chamber adapted to collapse if the pressure transmitted by the load to the chamber exceeds the weight of the load.

6. In a manually operated hardness tester having a hydraulic pressure transmission system and means for automatically eliminating air from the system comprising, in combination, two hydraulically connected cylinders, a reservoir for liquid surrounding one end of the first cylinder, a manually movable plunger whose end remains immersed in the reservoir of that cylinder, a plunger carrying an indentor movable in the other cylinder, a pressure relief valve located above both cylinders adapted to discharge any air in the system and the surplus of liquid ejected from the first cylinder and not taken up by the other, a conduit for the return of liquid discharged by the relief valve to the reservoir.

7. In a manually operated hardness tester having a hydraulic pressure transmission system and means for automatically eliminating air from the system comprising, in combination, two hydraulically connected cylinders, a reservoir for liquid surrounding one end of the first cylinder, a manually movable plunger whose end remains immersed in the reservoir of that cylinder, a plunger carrying an indentor movable in the other cylinder, a pressure relief valve located above both cylinders adapted to discharge any air in the system and the surplus of liquid ejected from the first cylinder and not taken up by the other, a conduit for the return of liquid discharged by the relief valve to the reservoir, a connection between the reservoir and the first cylinder for refilling the pressure system with liquid free of air, the connection being closed by operation of the plunger.

8. In a manually operated hardness tester having a hydraulic pressure transmission system, in combination, a frame, two hydraulically connected cylinders carried by the frame, one of the cylinders being free to pivot about an axis transverse to its bore, a plunger carrying an indentor in the other cylinder, a manually operated shaft carried by the frame, an arm on the shaft, a plunger movable in the pivoted cylinder connected to the arm, the parts being so proportioned that the arm and the plunger approach a dead center position when the indentor is under maximum pressure.

9. In a manually operated hardness tester having a hydraulic pressure transmission system, in combination, a frame, two hydraulically connected cylinders carried by the frame, one cylinder being free to pivot about an axis transverse to its bore, a plunger carrying an indentor in the other cylinder, a manually operated hand wheel carrying a pinion supported on the frame, a gear also supported by the frame driven by the pinion, an eccentric stud carried by the gear, a plunger movable in the pivoted cylinder connected to the stud, the parts being so proportioned so that the stud approaches the line joining the cylinder pivot and the axis of the gear when the indentor is under maximum pressure.

10. A hardness tester having, in combination, a frame, a support for a test specimen carried by the frame, a cylinder supported on the frame, a plunger in the cylinder, an indentor carried by the plunger and adapted to bear upon a specimen resting on the support, a second vertical cylinder supported on the frame, a plunger rod movable therein, a spring carried by the frame, a weight supported on the spring above the plunger rod, means for supplying liquid to both cylinders, the advance of the plunger rod progressively unloading the spring and increasing the pressure on the indentor by progressively increasing the pressure on the liquid.

11. A hardness tester having, in combination, a frame, a support for a test specimen carried by the frame, a cylinder supported on the frame, a plunger in the cylinder, an indentor carried by the plunger and adapted to bear upon a specimen resting on the support, a second vertical cylinder supported on the frame, a plunger rod movable therein, a spring carried by the frame, a weight supported on the spring above the plunger rod, a part intermediate the weight and the plunger rod, a spring preloaded to support the weight, the spring adapted to hold the said part a fixed distance from the weight, means for supplying liquid to both cylinders, the advance of the plunger rod against said part progressively unloading the spring and increasing the pressure on the indentor by progressively increasing the pressure on the liquid.

12. In a hardness tester, in combination, a cylinder, a plunger carrying an indentor movable therein, a supply of liquid to the cylinder, means for absorbing excess liquid after the indenting pressure is reached, comprising, an expansible chamber, a load lifted by the expansion of the chamber to absorb the excess liquid supply, means to prevent the inertia of the weight building up an abnormal pressure in the fluid after a test has been made and the liquid allowed to flow out if the outflow is checked allowing the inertia of the weight to create an abnormal pressure, said means including a spring intermediate the weight and the chamber, the spring being preloaded to support the weight.

STUART W. LYON.
FRANCIS C. HUYSER.